(12) United States Patent
Bugarcic et al.

(10) Patent No.: US 12,606,114 B2
(45) Date of Patent: Apr. 21, 2026

(54) PROTECTION DEVICE FOR A CAR, IN PARTICULAR A PASSENGER CAR, AND METHOD FOR OPERATING SUCH A PROTECTION DEVICE

(71) Applicant: Mercedes-Benz Group AG, Stuttgart (DE)

(72) Inventors: Dejan Bugarcic, Weinstadt (DE); Eric Gaertner, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/838,033

(22) PCT Filed: Feb. 10, 2023

(86) PCT No.: PCT/EP2023/053350
§ 371 (c)(1),
(2) Date: Aug. 13, 2024

(87) PCT Pub. No.: WO2023/152317
PCT Pub. Date: Aug. 17, 2023

(65) Prior Publication Data
US 2025/0136032 A1     May 1, 2025

(30) Foreign Application Priority Data
Feb. 14, 2022     (DE) ..................... 10 2022 000 547.6

(51) Int. Cl.
| | |
|---|---|
| B60R 21/205 | (2011.01) |
| B60R 21/2342 | (2011.01) |
| B60R 21/263 | (2011.01) |

(52) U.S. Cl.
CPC ........ B60R 21/205 (2013.01); B60R 21/2342 (2013.01); B60R 2021/2633 (2013.01)

(58) Field of Classification Search
CPC ...................... B60R 21/205; B60R 2021/2633
See application file for complete search history.

(56) References Cited

U.S. PATENT DOCUMENTS

| | | | | | |
|---|---|---|---|---|---|
| 5,308,113 | A | * | 5/1994 | Moriset ............... | B60R 21/2338 280/743.2 |
| 5,395,134 | A | * | 3/1995 | Gunn .................. | B60R 21/2342 280/743.1 |

(Continued)

FOREIGN PATENT DOCUMENTS

| | | | | | |
|---|---|---|---|---|---|
| CN | 110290983 | A | * | 9/2019 | ........... B60R 21/233 |
| DE | 19758208 | A1 | * | 7/1998 | ........... B60R 21/233 |

(Continued)

OTHER PUBLICATIONS

DE-19860804-A1 (machine translation) (Year: 2000).*

(Continued)

*Primary Examiner* — Jason D Shanske
*Assistant Examiner* — Joselynn Y Sliteris
(74) *Attorney, Agent, or Firm* — Crowell & Moring LLP

(57) ABSTRACT
A protection device for a car has a seat system arranged in the interior chamber of the car with at least one seat for a person, a steering handle that can be actuated by the person sitting on the seat to cause cornering of the car, and at least one airbag which, in the event of an accident, can be filled with a gas and thus can be shifted from a stowed position to a restraining position at least partially between the steering handle and at least one part of the seat. The airbag is formed as an at least two-stage airbag.

4 Claims, 5 Drawing Sheets

(56) References Cited

U.S. PATENT DOCUMENTS

| | | | | |
|---|---|---|---|---|
| 5,803,495 A * | 9/1998 | Jackson | .............. | B60R 21/2342 280/743.1 |
| 5,871,231 A * | 2/1999 | Richards | ............ | B60R 21/2342 280/735 |
| 6,334,627 B1 * | 1/2002 | Heym | ................ | B60R 21/2338 280/743.2 |
| 6,419,262 B1 | 7/2002 | Fendt et al. | | |
| 7,377,548 B2 * | 5/2008 | Bauer | ................... | B60R 21/231 280/743.2 |
| 10,214,174 B2 * | 2/2019 | Zhang | ................... | B60R 21/203 |
| 10,864,872 B2 | 12/2020 | Sheldon et al. | | |
| 2001/0035639 A1 * | 11/2001 | Amamori | ............. | B60R 21/233 280/740 |
| 2002/0175511 A1 * | 11/2002 | Dunkle | ............... | B60R 21/2338 280/743.2 |
| 2020/0001815 A1 | 1/2020 | Minakawa | | |
| 2021/0046893 A1 | 2/2021 | Rosenberg et al. | | |
| 2022/0001823 A1 | 1/2022 | Fuerst et al. | | |

FOREIGN PATENT DOCUMENTS

| | | | | | |
|---|---|---|---|---|---|
| DE | 19933836 A1 * | 2/2000 | .......... | B60R 21/233 |
| DE | 19860804 A1 * | 7/2000 | ......... | B60R 21/2032 |
| DE | 102017202332 A1 * | 8/2018 | .......... | B60R 21/233 |
| DE | 10 2019 112 653 A1 | 12/2019 | | |
| DE | 10 2019 105 341 A1 | 9/2020 | | |
| DE | 10 2019 118 970 A1 | 1/2021 | | |
| DE | 10 2020 101 803 A1 | 7/2021 | | |
| EP | 1 113 951 B1 | 7/2001 | | |
| FR | 2788026 A1 * | 7/2000 | .......... | B60R 21/235 |
| FR | 3156087 A1 * | 6/2025 | ............ | B60R 21/26 |
| JP | 2005329749 A * | 12/2005 | | |
| JP | 2008-44480 A | 2/2008 | | |
| JP | 2017213995 A * | 12/2017 | | |
| KR | 20120031804 A * | 4/2012 | | |
| KR | 20150130843 A * | 11/2015 | | |

OTHER PUBLICATIONS

FR-2788026-A1 (machine translation) (Year: 2000).*
CN-110290983-A (machine translation) (Year: 2019).*
DE-102017202332-A1 (machine translation) (Year: 2018).*
DE-19758208-A1 (machine translation) (Year: 1998).*
DE-19933836-A1 (machine translation) (Year: 2000).*
KR-20120031804-A (machine translation) (Year: 2012).*
KR-20150130843-A (machine translation) (Year: 2015).*
JP-2005329749-A (machine translation) (Year: 2005).*
JP-2017213995-A (machine translation) (Year: 2017).*
FR-3156087-A1 (machine translation) (Year: 2025).*
International Search Report (PCT/ISA/210) issued in PCT Application No. PCT/EP2023/053350 dated May 17, 2023 (2 pages).
German-language German Search Report issued in German Application No. 10 2022 000 547.6 dated Oct. 25, 2022, with partial English translation (9 pages).

* cited by examiner

A-A

B-B

PROTECTION DEVICE FOR A CAR, IN PARTICULAR A PASSENGER CAR, AND METHOD FOR OPERATING SUCH A PROTECTION DEVICE

BACKGROUND AND SUMMARY OF THE INVENTION

The invention relates to a protection device for a car, in particular for a passenger car. Furthermore, the invention relates to a method for operating such a protection device.

Such a protection device for a car, in particular for a passenger car, is already known from DE 10 2019 112 653 A1, for example. The protection device has a seat system arranged in the interior of the car having at least one seat for a person, such as the driver of the car, for example. Furthermore, a steering handle that can be actuated by the person sitting on the seat and thus can be moved, in particular, to cause cornering, lane changes and direction changes of the car is provided. An airbag, also referred to as an air bag, which can be filled with a gas in the event of an accident and can thus be shifted from a stowed position to a restraining position at least partially between the steering handle and at least one part of the seat and thus at least partially between steering handle and the person sitting on the seat is also provided.

Furthermore, US 2020/0001815 A1 discloses an occupant restraining structure for a vehicle. An occupant securing system for a motor vehicle is known from DE 10 2020 101 803 A1. Moreover, an arrangement of a driver airbag in a motor vehicle is known from DE 198 60 804 A1.

The object of the present invention is to create a protection device and a method, such that a particularly high degree of safety can be achieved.

In order to further develop a protection device of the kind specified herein in such a way that a particularly high degree of safety can be achieved, it is provided according to the invention that the airbag is formed as a two-stage airbag, which can be shifted from the stowed position to the restraining position and, in the restraining position, has and thus assumes a first volume, in particular in the interior of the car. Moreover, the airbag can be shifted from the stowed position to a catching position, wherein the airbag in the catching position has and thus assumes a second volume, in particular in the interior, that is greater in comparison to the first volume. The restraining position is also referred to as a first position, and the catching position is also referred to as a second position. The airbag can thus be shifted, i.e., moved, in a first step or as a first step from the stowed position to the first position, wherein the airbag in the first position has the first volume. Furthermore, the airbag can be shifted, i.e., moved, in a second step or as a second step from the stowed position to the second position, wherein the airbag in the second position has the second volume. In particular, it is provided that the airbag optionally is moved or can be moved from the stowed position to the first position or from the stowed position to the second position. Here it provided, in particular, that when shifting the airbag from the stowed position to the first position, thus to the restraining position, a shifting of the airbag extending beyond this to the second position, thus to the catching position, stops. In other words, it is preferably provided that when shifting the airbag from the stowed position to the restraining position, a shifting of the airbag to the catching position stops, such that when it is shifted to the first position, the airbag is not also shifted to the second position.

Furthermore, it is provided according to the invention that the protection device is formed to optionally cause a shifting of the airbag from the stowed position to the restraining position or a shifting of the airbag from the stowed position to the catching position depending on a spacing running at least in the longitudinal direction of the vehicle between at least one part of the seat system of the car, also referred to as a vehicle, and the steering handle and/or depending on an inclination of a backrest of the seat system, on the backrest of which the person can be supported with their back or can lean. If the spacing and/or the inclination, for example, exceeds a respective threshold value, the airbag, for example, is thus shifted from the stowed position to the second position, in particular via the first position, such that, in the event of the accident, the person can also be advantageously caught and restrained, in particular, when the backrest is excessively inclined and/or the seat system is removed excessively far from the steering handle in the longitudinal direction of the vehicle. For example, if the spacing and/or the inclination does not meet the threshold value or the spacing and/or the inclination corresponds to the threshold value, the airbag, for example, is thus shifted from the stowed position to the first position, yet not also to the second position, whereby the person, also referred to as the occupant, can be particularly advantageously caught and restrained.

The protection device can preferably comprise an adjusting device, by means of which, in the event of an accident of the car, the steering handle can be moved forwards at least in the longitudinal direction of the vehicle from a usage position to a safety position and thus away from the seat and thus away from the person sitting on the seat. For example, the steering handle is a steering wheel, which is arranged, for example, on a steering column and can be moved out of the usage position to the safety position, in particular together with the steering column. Furthermore, it is conceivable that the steering handle is an operating lever, also referred to as a joystick, which can be arranged on a steering column or on a column, for example, and can be able to be moved for example with the steering column or with the column from the usage position to the safety position. In particular, a first pyrotechnic actuator can be provided, by means of which, in the event of an accident, the steering handle can be moved particularly quickly from the usage position to the safety position. The feature that, in the event of an accident, the steering handle can be moved or is moved from the usage position to the safety position is to be understood to mean that the steering handle, for example, can be moved or is moved from the usage position to the safety position temporally before an actual emergence or before an actual start of the accident and/or during the accident. In particular, it is conceivable that the steering handle can be moved or is moved from the usage position to the safety position due to detecting the accident and/or temporally before detecting the accident. If, for example, the emergence or start of an accident is assessed as certain, i.e., as inevitable, i.e., if it is ascertained at a point in time, for example, that an accident involving the car will occur with a probability exceeding a threshold value at a future point in time in relation to the point in time, the steering handle, for example, can thus be moved from the usage position to the safety position at the future point in time and/or at the start of the accident and/or temporally before the future point in time and/or temporally before an actual start of the accident, wherein alternatively or additionally the steering handle can be moved from the usage position to the safety position during the accident, i.e., during the course of the accident. Furthermore, it is conceivable that the steering handle, for example, is already in the safety position at the start of the accident and thus is or has been moved from the usage position to the safety position before the start of the accident. With the invention, it is possible to implement a two-stage unfolding of the airbag, in particular by means of different gas volumes of the airbag, in order to inflate the airbag corresponding to a respective position of the steering handle, also referred to as the steering wheel position, in particular in relation to the seat system. Here, the second volume is advantageous, which is greater than the first volume by a volume portion, wherein the volume portion, for example, fills up a space of the retracted steering handle, i.e., steering handle in the safety position, in comparison to the non-retracted steering handle, i.e., fills up the space which is free, when the steering handle is moved from the usage position to the safety position.

For example, at least one second pyrotechnic actuator can be allocated to the airbag, the actuator being able to be ignited at least in two stages, such that at least or exactly two ignition stages, that is a first ignition stage and at least one second ignition stage of the second pyrotechnic actuator, can be ignited. In order to move the airbag, for example, from the stowed position to the first position, only the first ignition stage is ignited, in relation to the ignition stages, such that the airbag is moved from the stowed position to the first position, yet not also to the second position. In order to move the airbag, for example, from the stowed position to the second position (catching position), both the first ignition stage and the second ignition stage, for example, are ignited, whereby the airbag is moved from the stowed position, in particular via the first position (restraining position), to the second position (catching position). Igniting the ignition stages, also referred to simply as stages, of the pyrotechnic actuator can be carried out at least partially, in particular at least extensively or completely, simultaneously, or the ignition stages are ignited temporally one after the other, such that firstly the first ignition stage is ignited, for example, and in particular after an end of the ignition of the first ignition stage, the second ignition stage is ignited. In doing so, the airbag, for example, is firstly moved from the stowed position to the first position and then from the first position to the second position, whereby overall the airbag is moved from the stowed position to the second position.

A control unit, for example, is provided. In particular, the control unit can be an electronic computing device. The control unit is connected to the adjusting device, also referred to as adjusting unit, for example, and/or to the steering handle, such that the adjusting device, for example, can be controlled by means of the control unit, in order to thus move the steering handle from the usage position to the safety position by means of the adjusting device, for example. Furthermore, it is conceivable that the control unit is connected, in particular as well, to the airbag and/or to the second pyrotechnic actuator, such that the control unit, for example, can control, in particular as well, the airbag or the second pyrotechnic actuator, in order to thus optionally move the airbag from the stowed position to the first position or from the stowed position to the second position, for example, in particular by means of the second pyrotechnic actuator.

In an embodiment, the control unit is formed to move the steering handle from the usage position to the safety position in the event of an activation of a manual driving operation, in which the person themselves drives the vehicle, and/or immediately before an accident, also referred to as an accident occurrence, and/or during the accident or to cause such a movement of the steering handle from the usage position to the safety position and/or to activate the airbag, in particular as well, immediately during and/or upon reaching the safety position using the steering handle. In other words, it can be provided that moving the airbag from the stowed position to one of the positions is carried out while the steering handle is moved from the usage position to the safety position and/or after the steering handle has reached the safety position.

As a result of the invention, it can be ensured that an effective occupant protection is obtained with a reclined seat position and/or with a shallower inclination of the backrest, also referred to as leaning inclination, and with a retracted steering handle, i.e., when the steering handle is in the safety position, namely by the second volume of the airbag greater than the first volume, the respective volume of which is also referred to as the airbag volume. Furthermore, it is conceivable that the airbag has several airbag stages, i.e., more than the two stages mentioned, in order to be able to implement a particular high degree of safety, for example even with different seat positions and/or sizes of occupants. As a result of the invention, with a seat position reclined far back and/or with a shallower backrest inclination and a retracted steering handle, an unimpeded unfolding of the airbag can also be ensured by means of a sequential ignition of the first and then the second ignition stage. Here, for example, the airbag is formed in such a way that, with the steering handle retracted into the safety position, the first ignition stage is firstly ignited, for example, whereby the airbag is moved into the first position, i.e., unfolded, and assumes the first volume. For example, the first volume is generated using known technologies such as using at least or exactly one retaining strap and/or using at least or exactly one dart and/or using at least or exactly one tear seam, for example. For example, the airbag in the first position and thus with the first volume has a bent, in particular on the side of the outer periphery, shape and/or a specific fold at least in a partial region, in order to enable a safe unfolding of the airbag, for example, in particular via the steering handle.

A method for operating a protection device according to the invention also belongs to the invention. Advantages and advantageous designs of the protection device according to the invention are to be seen as advantages and advantageous designs of the method according to the invention and vice versa.

Further advantages, features and details of the invention emerge from the description below of preferred exemplary embodiments and by means of the drawings. The features and feature combinations mentioned above in the description and the features and feature combinations mentioned below in the description of the figures and/or shown only in the Figures can be used not only in the respectively specified combination, but also in other combinations or on their own without leaving the scope of the invention.

DETAILED DESCRIPTION OF THE DRAWINGS

In the Figures, the same or functionally identical elements are provided with the same reference numbers.

Figure 1:
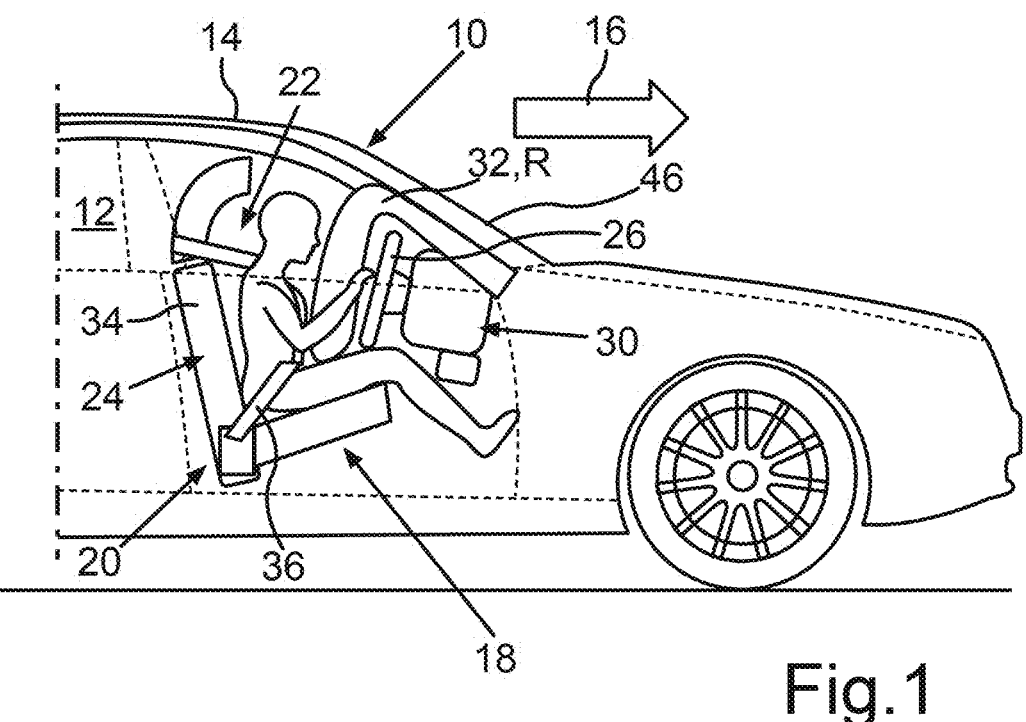
FIG. 1, in sections, is a schematic and cut-out side view of a car formed as a passenger car, having a protection device according to the invention.

FIG. 1 shows, in sections, in a schematic side view a car 10 formed as a passenger car and also referred to as a vehicle or motor vehicle, the interior chamber 12 of which, also referred to as passenger cabin or passenger chamber, is delimited by a construction 14, formed, for example, as a self-supporting bodywork, of the car 10. In FIG. 1, a forwards driving direction of the car 10 is illustrated by an arrow 16. The car 10 also comprises a protection device 18, which is explained in more detail below. The protection device 18 has a seat system 20 arranged in the interior chamber 12. In the exemplary embodiment shown in FIG. 1, the seat system 20 is a vehicle seat, also referred to as an individual seat, which has at least one seat 22 for a person 24, also referred to as an occupant or seat occupant. It can be seen from FIG. 1 that the person 24 sits on the seat 22 and thus on or in the seat system 20. A steering handle 26 that can be actuated by the person 24 sitting on the seat 22 is also provided to cause cornering, lane changes and direction changes of the car 10. In the exemplary embodiment shown in FIG. 1, the steering handle 26 is a steering wheel, which, as can be seen when viewed together with FIG. 2, in particular, is held on a steering column 28, for example, in particular such that it can be rotated. In particular, the steering column 28 can have a casing tube. An adjusting device 30 which is only depicted very schematically in the Fig. and can comprise the casing tube mentioned above, for example, is also provided. In particular, the adjusting device 30 can have or can be a pyrotechnic casing tube intake device. The steering handle 26, in particular together with the steering column 28, can be moved by means of the adjusting deice 30 in the event of an accident of the car 10 forwards at least in the longitudinal direction of the vehicle from a usage position to a safety position and thus away from the seat 22 and from the person 24 sitting on the seat 22. Furthermore, the protection device 18 has at least one airbag 32, also referred to as an air bag, which, in the event of the accident, can be filled with a gas comprising at least air, for example, and can thus be moved from a stowed position V depicted in FIG. 2 to a restraining position depicted in FIG. 1. It can be seen from FIG. 1 that the airbag 32 in the restraining position R is arranged at least partially between the steering handle 26 and the seat 22 and thus between the person 24 and the steering handle 26 in the longitudinal direction of the vehicle. In particular, the airbag 32 can be a component of an airbag system, which can also have a housing 35, in which the airbag 32 can be received in the stowed position V. Furthermore, it is conceivable that the airbag system has a gas generator, by means of which the gas can be provided and thus the airbag 32 can be filled with the gas, whereby the airbag 32 can be shifted from the stowed position V to the restraining position R, i.e., can be moved, in particular by unfolding the airbag 32. Thus, shifting the airbag 32 from the stowed position V to the restraining position R is also referred to as unfolding the airbag 32. In particular, the gas generator is a pyrotechnic actuator.

Figures 7, 8:
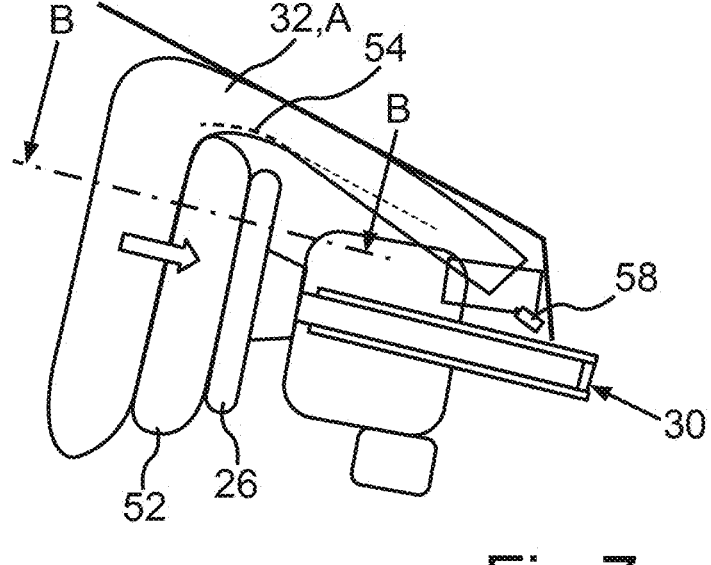
FIG. 7 is a schematic side view of the protection device, wherein the airbag is in a catching position (second position)
FIG. 8 is a schematic sectional depiction of the protection device in a sectional plane labelled with B-B in FIG. 7.
Figure 9:
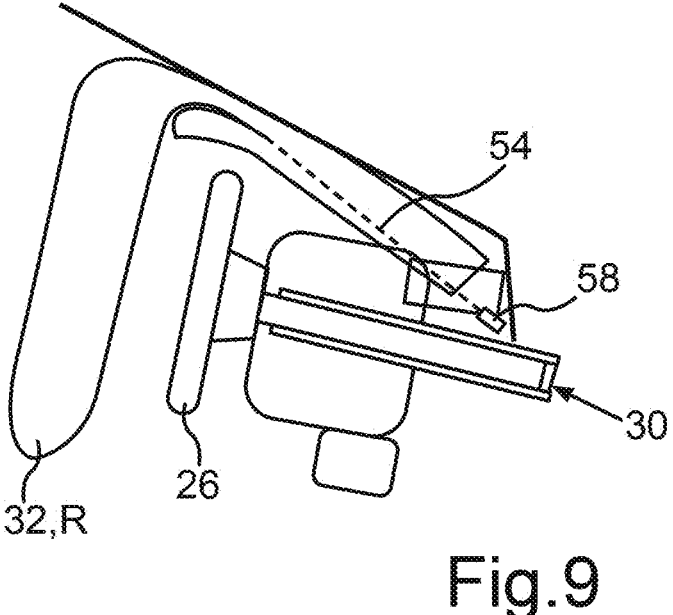
FIG. 9 is a schematic side view of a third embodiment of the protection device, wherein the airbag is in the restraining position.
Figure 10:
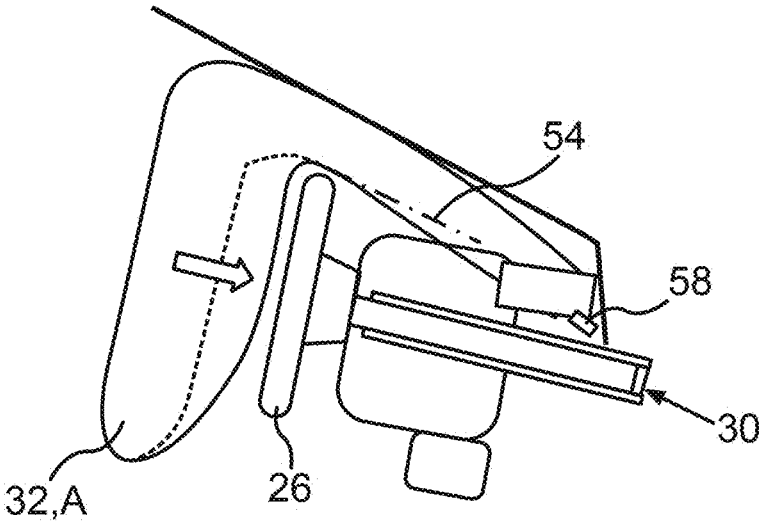
FIG. 10 is a schematic side view of the third embodiment, wherein the airbag is in the catching position.

In order to now be able to achieve a particularly high degree of safety, the airbag 32 is formed as an at least two-stage airbag. Thus, the gas generator, for example, is formed as an at least two-stage gas generator, which has, for example, a first ignitable stage and a second ignitable stage. The stages of the gas generator are also referred to as ignition stages. The airbag 32 can be shifted from the stowed position V to the restraining position R by means of the gas generator, in particular by igniting the first stage and in particular while igniting the second stage stops, wherein the airbag 32 in the restraining position R has a first volume, and thus occupies the interior chamber 12. Furthermore, the airbag 32 can be shifted, i.e., unfolded, from the stowed position V to a catching position A that can be seen in FIG. 8, for example, in particular by means of the gas generator and quite particularly by igniting both the first stage and the second stage, wherein the airbag 32 in the catching position A has a second volume, and thus occupies the interior chamber 12, wherein the second volume is greater than the first volume. The restraining position R is also referred to as the first position or is a first position of the airbag 32, wherein the catching position A is a second position of the airbag 32 or is referred to as the second position.

The protection device 18 is now formed to optionally cause a shifting of the airbag 32 from the stowed position V to the restraining position R or a shifting of the airbag 32 from the stowed position V to the catching position A, i.e., to optionally ignite either the first stage, i.e., in particular only or exclusively the first stage based on the first stage and the second stage, or both the first stage and the second stage, depending on a spacing, running at least in the longitudinal direction of the vehicle, between at least one part of the seat system 20 and the steering handle 26, i.e., for example depending on a seat position of the seat system 20 viewed or running in a longitudinal direction of the vehicle and/or depending on an inclination of a backrest 34 of the seat system 20. By igniting only the first stage, yet not also the second stage, the airbag 32 comes out of its stowed position V to the restraining position R, yet not to the catching position A. By igniting both the first stage and the second stage, the airbag 32 comes out of its stowed position V o the catching position A, in particular via the restraining position R.

In the Figures, a seatbelt is labelled with 36. The designs above and below relating to the car 10 can of course also be transferred to other vehicles and, in particular, to other means of transport.

Figure 2:
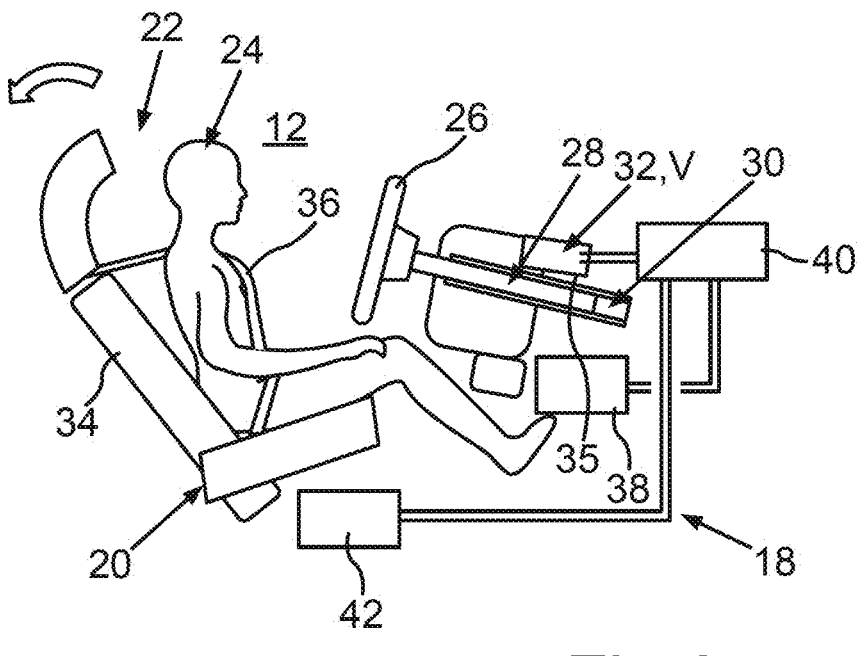
FIG. 2 is a schematic side view of a first embodiment of the protection device.

It can be seen from FIG. 2 that the protection device 18, for example, can have a first control unit 38, a second control unit 40 and a third control unit 42. The control units 38, 40 and 42 are, for example, electronic computing devices and can thus also be referred to as control devices. The control unit 38 is formed, for example, to control the adjusting device and thus to cause the movement of the steering handle 26 from the usage position to the safety position. The control unit 40 is formed, for example, to control the gas generator and thus to optionally ignite the first stage, i.e., exclusively the first stage in particular in terms of the first stage and the second stage, or both the first stage and the second stage and thus to optionally cause the shifting of the airbag 32 from the stowed position V to the restraining position R or the shifting of the airbag from the stowed position V to the catching position A. The control unit 42 is allocated to the seat system 20, for example. For example, the control unit 42 can control at least one or more motors, whereby the previously mentioned seat position and/or the inclination of the backrest 34, for example, can be set. In FIG. 2, for example, the control unit 40 is connected, in particular directly, to the control unit 42, and for example the control unit 40 is connected, in particularly directly, to the control unit 38.

Figures 3, 4:
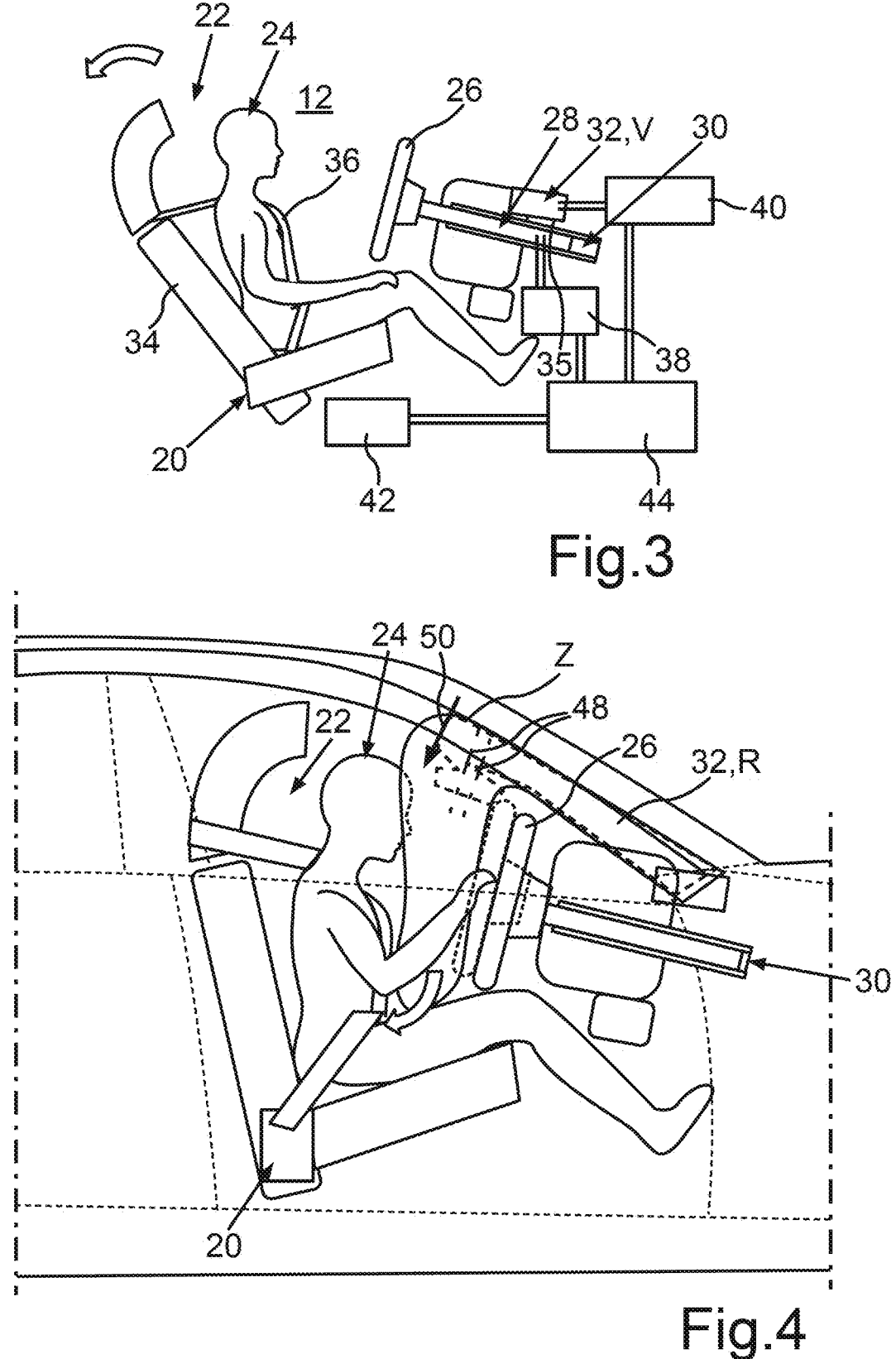
FIG. 3 is a schematic side view of a second embodiment of the protection device.
FIG. 4 is a schematic side view of the protection device, wherein an airbag of the protection device is in a restraining position (first position)

In FIG. 3, a further, additional, central control unit 44 is provided, which is a further electronic computing device, for example. It can be seen from FIG. 3 that the control unit 40 can be connected, in particular directly, to the control unit 44, the control unit 38, in particular directly, to the control unit 44 and the control unit 42, in particular directly, to the control unit 44. For example, the airbag 32 and here preferably also the gas generator and the housing 35, for example, are a component of an airbag protection system, which can be housed in a cockpit and here, in particular, in the interior chamber 12. In particular, the control unit 38 can control the airbag system and thus cause the shifting of the airbag 32, in particular. Since the control unit 38, for example, can optionally shift the airbag to the restraining position or to the catching position A, the control unit 38 can set, i.e., control or regulate, the volume of the airbag 32. For example, the airbag 32 in the catching position A has greater dimensions, running in the longitudinal direction, in particular, between the steering handle 26 and the seat 22, the dimensions also being referred to as depth, wherein the depth of the airbag 32 in the catching position A is greater than in the restraining position R. Thus, with the protection device 18, a depth adaptation or depth control can be implemented, since the airbag 32 can optionally be moved into the first position or into the second position. The first position can be implemented, for example, by a first airbag stage and here in particular by a first main chamber, which is filled with the gas. If, for example, the steering handle 26 is moved into the safety position, in particular due to a previous accident or a previous collision, the airbag system is activated, for example, and the airbag 32 can unfold unimpeded via the retracted steering handle 26 thus in the safety position, and as a result assume its restraining position R or its catching position A. The airbag system, in particular the airbag 32, is preferably arranged and designed in such a way that the airbag system or the airbag 32 can be safely unfolded with a distance apart from the steering handle 26. This can be implemented, for example, using known technologies such as using a shape of the airbag 32, for example and/or restraining straps and/or darts and/or at least one tear seam. Preferably, the airbag 32 has a bent, in particular on the side of the outer periphery, shape and preferably a specific folding, at least in the restraining position R and/or in the catching position A, in order to enable a safe unfolding of the airbag 32 via the steering handle 26. In a possible design, the control unit 38 and/or the control unknit 40 are connected to the control unit 42. In particular according to FIG. 3, a respective connection of the control units 38, 40, 42, in particular to one another, can be provided via the central control unit 44. Furthermore, it is conceivable that the control unit 38 and the control unit 42 can be connected, in particular respectively directly, to the control unknit 40 of the airbag system.

In a design, the control unit 38 and the control unit 40 can be formed in such a way that, for example with an activation of an automatic driving operation of the car 10 and when using a more comfortable seat setting of the seat system 20, shown in FIGS. 2 and 3, the more comfortable seat position of which differing from a conventional seat position, for example shown in FIG. 4, the steering handle 26 is moved into the safety position in particular immediately before an accident occurrence or during an accident occurrence and also the control unit 40 of the airbag system is activated immediately during and/or after reaching the safety position of the steering handle 26 and, in doing so, the airbag 32 is shifted into the catching position A. Here, the control unit of the seat system 20, for example, is used in order to check, i.e., to ascertain, the seat position of the person 24, in particular currently set. In other words, in the more comfortable seat setting, the backrest 34, for example is inclined more greatly and thus shallower than in the conventional seat position, and/or the seat system 20 is arranged further from the steering handle 26 in particular in the usage position in the longitudinal direction of the vehicle, and thus set back further in the longitudinal direction of the vehicle. If, for example in the event of a collision or in the event of an accident, the seat system 20 is in the conventional position, the airbag 32 is shifted from the stowed position V to the restraining position R, yet not to the catching position A. However, if the seat system 20 in the event of an accident is in the more comfortable seat position, then the airbag 32 is shifted from the stowed position V to the restraining position R. In doing so, an airbag depth control, for example, is carried out since the airbag 32 in the catching position A has the greater depth than in the restraining position R. Thus, if it is recognized, for example, that the seat system 20 formed, in particular, as a driver seat, is set further behind and/or has a shallower backrest inclination, then the control unit 40 of the airbag system 32, for example, is additionally activated for the airbag depth control, i.e., in such a way that the airbag 32 is not moved from the stowed position V or not only to the restraining position R, but, in particular further, to the catching position A.

Usually, the control unit 40 ignites the first stage, in particular in relation to the stages not only the first stage, of the gas generator, in particular immediately during and/or upon reaching the safety position of the steering handle 26, and upon recognising the seat set backwards and/or the shallower backrest inclination, not only the first stage, but also the second stage of the gas generator is ignited, whereby the airbag 32 is moved to the catching position A and occupies the second volume that is greater in comparison to the first volume. The ignition of the second stage of the gas generator does not necessarily have to take place at the same as the ignition of the first stage. Preferably, the ignition of the second stage is only carried out after the entire unfolding of the airbag 32 to the restraining position R and/or in the position of the unfolding of the airbag 32 via the retracted steering handle 26. in doing so, it can be ensured, in particular, that with a seat position set backwards and/or shallower backrest inclination, and with a retracted steering wheel such as the steering handle 26, an effective degree of occupant protection is obtained by the greater second volume. It is also conceivable that the airbag 32 has several airbag stages in order to here safely protect different seat positions and/or occupant sizes.

As a result of this embodiment, with a seat position set backwards and/or shallower backrest inclination and with a retracted steering wheel such as the steering handle 26, an unimpeded unfolding of the airbag 32 is carried out by means of a sequential ignition of the first and then the second stage is carried out. Here, the airbag system, for example, in particular the airbag 32, is designed in such a way that, with the steering handle 26 in the safety position, firstly the first stage is ignited, whereby the airbag 32 firstly comes to the restraining position R and firstly occupies the first volume, which is generated, for example, by conventional and known technologies, such as by a retaining strap and/or by darts and/or a tear seam. In particular in the restraining position R, the airbag 32 has a specific fold, in particular on the side of the outer periphery, in order to enable a safe unfolding via the steering handle 26.

Preferably, upon igniting the first stage, the airbag 32 is unfolded along a windscreen pane 46 and with a certain distance from the steering handle 26. As soon as the airbag 32 is unfolded completely into the restraining position, the airbag 32 is preferably supported on the windscreen pane 46 and in the region of the lower body of the person 24.

The second stage is ignited due to the seat system 20 set back and/or shallower backrest inclination and due to the retracted steering handle 26, in particular during the unfolding process or preferably only after the unfolding process into the restraining position R. Here, the airbag 32, for example, in particular in the catching position A, is arranged and designed in such a way that, with the steering handle 26 retracted into the safety position, a first airbag volume, in particular the main chamber, is positioned in front of the occupant and a second airbag stage preferably unfolds between the first airbag stage and the steering handle 26. A design of the second airbag stage can be generated by conventional and known technologies such as, for example, by a retaining strap and/or darts and/or tear seam. If the second airbag stage of the airbag 32 is arranged between the retracted steering handle 26 and the first airbag stage, a particularly safe unfolding can be implemented away from the occupant by an unfolding device, whereby a particularly high degree of safety can be depicted. There can also be a sufficient degree of occupant protection since the first airbag stage is firstly unfolded before the second airbag stage is unfolded, whereby a particularly high degree of safety can be depicted. In general, in doing so a safe unfolding via the retracted steering handle 26 can be ensured, since firstly the first airbag stage and thus the smaller first volume is fired, and thus the airbag 32 firstly comes to the restraining position R, for example, and thus firstly occupies the first volume and, in particular firstly, then comes to the catching position A and then occupies the second volume.

A further embodiment not depicted in the illustration can be that the second airbag stage unfolds between the occupant (person 24) and the first airbag stage.

Figure 5:
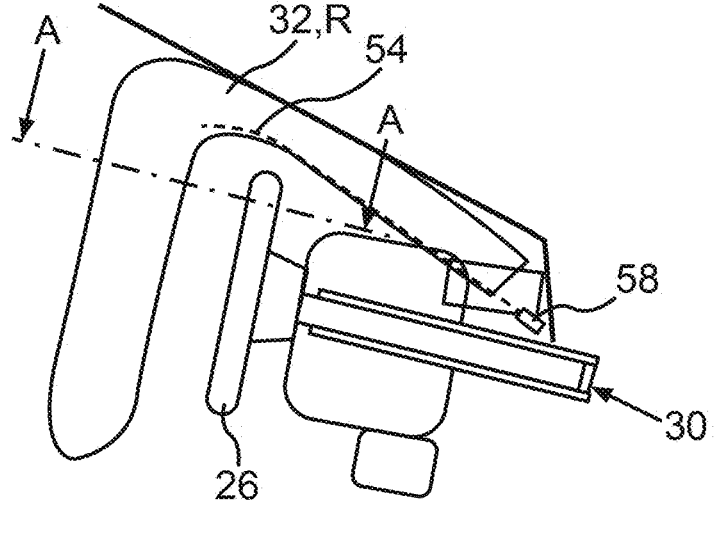
FIG. 5 is a further schematic side view of the protection device, wherein the airbag is in the restraining position.
Figure 6:
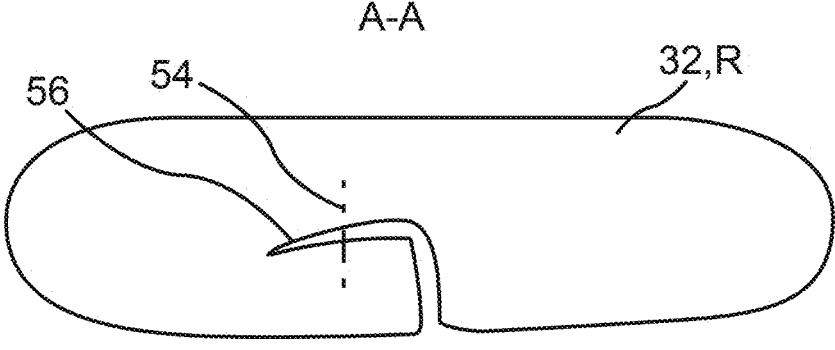
FIG. 6 is a schematic sectional view of the protection device according to FIG. 5 on a sectional plane A-A shown in FIG. 5.

In FIG. 4, an intermediary position of the airbag 32 is shown with Z, wherein the airbag 32 can be moved out of the stowed position V via the intermediary position Z to the restraining position R and in particular also to the catching position A. The intermediary position Z is implemented, in particular extensively, for example by at least one or more tear seams 48, which, as illustrated by an arrow 50, rip starting from the intermediary position Z with further filling of the airbag 32 with gas and thus release the airbag 32 for an unfolding from the intermediary position Z to the restraining position R or optionally to the catching position A. The second airbag stage that is implemented or can be implemented by an airbag chamber of the airbag 32 provided in addition to the main chamber is labelled with 52 in FIG. 7, whereby the particularly large second volume can be achieved. For example, a retaining strap is labelled with 54 for implementing the restraining position R, i.e., in particular for holding the airbag 32 in the restraining position R and in particular for avoiding the airbag 32 undesirably coming out the restraining position R to the catching position A. An additional device of the airbag 32 formed as a fold or pocket is labelled with 56, wherein the fold or pocket can be, for example, a fabric fold or fabric pocket of the airbag 32. Furthermore, in FIG. 5 an igniter is labelled with 58, by means of which the retaining strap 54, for example, can be released. An unfolding or opening out of the airbag 32 directed inwardly, in particular with its movement into the catching position A, is advantageous since, in doing so, a safe unfolding of the airbag 32 via the steering handle 26 can be implemented, wherein a blocking or shooting of the steering handle 26 can be avoided. Moreover, an unfolding of the airbag 32 into the catching position A away from the occupant (person 24) can enable an advantageous protection. Moreover, a high degree of protection can be guaranteed, even without depth adaptivity.

LIST OF REFERENCE CHARACTERS

10 Car
12 Interior chamber
14 Construction
16 Arrow
18 Protection device
20 Seat system
22 Seat
24 Person
26 Steering handle
28 Steering column
30 Adjusting device
32 Airbag
34 Backrest
35 Housing
36 Seatbelt
38 Control unit
40 Control unit
42 Control unit
44 Control unit
46 Windscreen pane
48 Tear seam
50 Arrow
52 Airbag stage
54 Retaining strap
56 Device
58 Igniter/
A Catching position
R Restraining position
V Stowed position
Z Intermediary position

The invention claimed is:

1. A protection device (18) of a car (10), comprising:
a seat system (20) disposed in an interior chamber (12) of the car (10) with a seat (22);
a steering handle (26) that is actuatable by a person (24) sitting on the seat (22);
a control unit (40); and
an airbag (32) which, in an event of an accident, is fillable with a gas and thus is shiftable from a stowed position (V) to a restraining position (R) at least partially between the steering handle (26) and at least one part of the seat (22);
wherein the airbag (32) is formed with a first airbag stage and a second airbag stage wherein:
the airbag (32) is shiftable from the stowed position (V) to the restraining position (R) by unfolding the airbag (32) along a windscreen pane (46) and with a distance from the steering handle (26) when the first airbag stage unfolds and, as soon as the airbag (32) is completely unfolded to the restraining position (R), the airbag (32) is directly supported on the windscreen pane (46) and in a region of a lower body of the person (24) and has a first volume in the restraining position (R); and the airbag (32) is shiftable from the stowed position (V) to a catching position (A) by unfolding the first airbag stage and the second airbag stage and, in the catching position (A), the airbag (32) has a second volume that is greater than the first volume;

wherein the control unit (40) ignites only a first ignitable stage of a two-stage gas generator to unfold the first airbag stage to shift the airbag (32) from the stowed position (V) to the restraining position (R) when the control unit (40) recognizes that a distance between at least one part of the seat system (20) and the steering handle (26) running at least in a longitudinal direction of the car is less than a threshold value and wherein the control unit (40) ignites both the first ignitable stage of the two-stage gas generator and a second ignitable stage of the two-stage gas generator to unfold the first airbag stage and the second airbag stage to shift the airbag (32) from the stowed position (V) to the catching position (A) when the control unit (40) recognizes that the distance between the at least one part of the seat system (20) and the steering handle (26) running at least in the longitudinal direction of the car is greater than the threshold value;

wherein the first airbag stage of the air bag is disposed between the steering handle (26) and the at least one part of the seat system (20), wherein the second airbag stage of the air bag is disposed between the steering handle (26) and the first airbag stage of the air bag, and wherein the second airbag stage is disposed in the longitudinal direction of the car closer to the steering handle (26) than the first airbag stage.

2. The protection device (18) according to claim 1, wherein, when shifting the airbag (32) from the stowed position (V) to the restraining position (R), a shifting of the airbag (32) to the catching position (A) stops.

3. The protection device (18) according to claim 1, wherein when shifting the airbag (32) from the stowed position (V) to the catching position (A), a shifting of the airbag (32) from the stowed position (V) via the restraining position (R) to the catching position (A) is carried out.

4. A method for operating the protection device (18) according to claim 1.

* * * * *